US012723809B2

(12) United States Patent
Asano

(10) Patent No.: US 12,723,809 B2
(45) Date of Patent: Sep. 1, 2026

(54) TRANSPORT DEVICE, DRYING DEVICE, AND PRINTING APPARATUS

(71) Applicant: FUJIFILM Corporation, Tokyo (JP)

(72) Inventor: Yuji Asano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 931 days.

(21) Appl. No.: 17/938,662

(22) Filed: Oct. 6, 2022

(65) Prior Publication Data

US 2023/0034087 A1 Feb. 2, 2023

Related U.S. Application Data

(63) Continuation of application No. PCT/JP2021/010427, filed on Mar. 15, 2021.

(30) Foreign Application Priority Data

Apr. 24, 2020 (JP) ................................ 2020-077490

(51) Int. Cl.
*B41J 11/00* (2006.01)
*B65H 5/06* (2006.01)
(Continued)

(52) U.S. Cl.
CPC ............. *F26B 13/14* (2013.01); *B41J 11/002* (2013.01); *B41J 11/0024* (2021.01);
(Continued)

(58) Field of Classification Search
CPC ........ F26B 13/14; F26B 13/108; F26B 13/18; B41J 11/0024; B41J 11/002;
(Continued)

(56) References Cited

U.S. PATENT DOCUMENTS 5,465,661 A 11/1995 White
9,475,313 B2 10/2016 Ebihara et al.
(Continued)

FOREIGN PATENT DOCUMENTS

DE 197 10 124 A1 9/1998
JP 2009-174819 A 8/2009
(Continued)

OTHER PUBLICATIONS

International Search Report issued in PCT/JP2021/010427; mailed Apr. 27, 2021.

(Continued)

*Primary Examiner* — Connor J Tremarche
(74) *Attorney, Agent, or Firm* — Studebaker Brackett PLLC

(57) ABSTRACT

There is provided a transport device which transports a web-shaped substrate from a first atmosphere of a first atmosphere temperature to a second atmosphere of a second atmosphere temperature different from the first atmosphere temperature along a transport path, the transport device including a plurality of pass rollers that are disposed in the transport path and that each support the substrate, and a plurality of heaters that heat the plurality of pass rollers respectively. The plurality of heaters perform heating such that the closer a pass roller is to an upstream side of the transport path, the closer a temperature to which the pass roller is heated is to the first atmosphere temperature and the closer a pass roller is to a downstream side of the transport path, the closer a temperature to which the pass roller is heated is to the second atmosphere temperature.

13 Claims, 10 Drawing Sheets

(51) Int. Cl.

| | |
|---|---|
| ***F26B 13/10*** | (2006.01) |
| ***F26B 13/14*** | (2006.01) |
| ***F26B 13/18*** | (2006.01) |
| ***G05D 23/19*** | (2006.01) |
| ***H05B 1/02*** | (2006.01) |

(52) U.S. Cl.

CPC ............ *F26B 13/108* (2013.01); *F26B 13/18* (2013.01); *G05D 23/1927* (2013.01); *H05B 1/023* (2013.01); *B65H 2301/5143* (2013.01); *B65H 2301/5144* (2013.01)

(58) Field of Classification Search

CPC ........ B65H 2301/143; B65H 2301/144; G05D 23/1927; H05B 1/023

See application file for complete search history.

(56) References Cited

U.S. PATENT DOCUMENTS

| | | | | |
|---|---|---|---|---|
| 2012/0009349 | A1* | 1/2012 | Shinokawa | C23C 14/541 427/294 |
| 2015/0346659 | A1* | 12/2015 | Nagayama | G03G 15/2039 101/424.1 |
| 2017/0036470 | A1 | 2/2017 | Shikawa | |
| 2017/0060055 | A1* | 3/2017 | Abe | G03G 15/2039 |
| 2017/0334217 | A1* | 11/2017 | Yoshinuma | B41J 11/0015 |
| 2018/0111158 | A1* | 4/2018 | Tanikawa | F26B 13/08 |
| 2018/0236784 | A1 | 8/2018 | Okada | |
| 2020/0023634 | A1* | 1/2020 | Dedic | B41F 23/0483 |

FOREIGN PATENT DOCUMENTS

| | | | |
|---|---|---|---|
| JP | 2012-107792 | A | 6/2012 |
| JP | 2016-112727 | A | 6/2016 |
| JP | 2017-035870 | A | 2/2017 |
| JP | 2018-134792 | A | 8/2018 |

OTHER PUBLICATIONS

International Preliminary Report On Patentability (Chapter I) and Written Opinion of the International Searching Authority issued in PCT/JP2021/010427; issued Oct. 25, 2022.

An Office Action; “Notice of Reasons for Refusal,” mailed by the Japanese Patent Office on Feb. 21, 2024, which corresponds to Japanese Patent Application No. 2022-516886 and is related to U.S. Appl. No. 17/938,662; with English language translation.

Communication pursuant to Article 94(3) EPC issued by the European Patent Office on Nov. 19, 2024, which corresponds to European Patent Application No. 21 793 415.7-1002 and is related to U.S. Appl. No. 17/938,662.

The extended European search report issued by the European Patent Office on Sep. 12, 2023, which corresponds to European Patent Application No. 21793415.7-1002 and is related to U.S. Appl. No. 17/938,662.

* cited by examiner

F3A
F3B
100
102
102B
102C
106
102D
PORTION WHERE WRINKLES ARE SIGNIFICANT
TRANSPORT DIRECTION
THERMAL EXPANSION
CONTRACTION
1

FIG. 7

| | | DRYING TEMPERATURE | | | | | | | |
|---|---|---|---|---|---|---|---|---|---|
| | | 80°C | 60°C | 80°C | 60°C | 80°C | 60°C | 80°C | 60°C |
| TYPE OF SUBSTRATE | | PET 25 μm | | OPP 20 μm | | PET 12 μm | | oNy 16 μm | |
| TRANSPORT TENSION | | 40N | | | | | | | |
| SET VALUE FOR HOT AIR HEATER [°C] | 14A | 60 | 40 | 70 | 50 | 60 | 40 | 70 | 50 |
| | 14B | 40 | 20 | 60 | 40 | 40 | 20 | 60 | 40 |
| | 14C | 20 | 20 | 50 | 30 | 20 | 20 | 50 | 30 |
| | 14D | 20 | 20 | 40 | 20 | 20 | 20 | 40 | 20 |

FIG. 8

| | | DRYING TEMPERATURE | | | | | | | |
|---|---|---|---|---|---|---|---|---|---|
| | | 80°C | 60°C | 80°C | 60°C | 80°C | 60°C | 80°C | 60°C |
| TYPE OF SUBSTRATE | | PET 25 μm | | OPP 20 μm | | PET 12 μm | | oNy 16 μm | |
| TRANSPORT TENSION | | 20N | | | | | | | |
| SET VALUE FOR HOT AIR HEATER [°C] | 14A | 20 | 20 | 70 | 40 | 60 | 40 | 60 | 40 |
| | 14B | 20 | 20 | 60 | 20 | 40 | 20 | 40 | 20 |
| | 14C | 20 | 20 | 40 | 20 | 20 | 20 | 20 | 20 |
| | 14D | 20 | 20 | 20 | 20 | 20 | 20 | 20 | 20 |

IN CASE OF NATURAL HEAT DISSIPATION

| ELAPSED TIME [sec] | TEMPERATURE OF SUBSTRATE [°C] |
|---|---|
| 0 | 60.00 |
| 1 | 44.94 |
| 2 | 36.28 |
| 3 | 31.13 |
| 4 | 28.00 |
| 5 | 26.09 |
| 6 | 24.92 |
| 7 | 24.19 |
| 8 | 23.74 |
| 9 | 23.46 |
| 10 | 23.28 |

IN CASE OF USE OF SPOT COOLERS

| ELAPSED TIME [sec] | TEMPERATURE OF SUBSTRATE [°C] |
|---|---|
| 0 | 60.00 |
| 1 | 40.14 |
| 2 | 28.64 |
| 3 | 21.68 |

FIG. 12

TRANSPORT DEVICE, DRYING DEVICE, AND PRINTING APPARATUS

CROSS-REFERENCE TO RELATED APPLICATIONS

This application is a Continuation of PCT International Application No. PCT/JP2021/010427 filed on Mar. 15, 2021, which claims priority under 35 U.S.C § 119(a) to Japanese Patent Application No. 2020-077490 filed on Apr. 24, 2020. Each of the above application(s) is hereby expressly incorporated by reference, in its entirety, into the present application.

BACKGROUND OF THE INVENTION

1. Field of the Invention

The present invention relates to a transport device, a drying device, and a printing apparatus, and particularly relates to a technique of transporting a web-shaped substrate in an environment with a temperature gradient difference.

2. Description of the Related Art

A transport device transporting a web-shaped substrate is known (refer to JP2012-107792A and JP2018-134792A). In a case where a substrate to which ink has been applied for printing is to be dried while being transported, hot air is blown onto the substrate. Generally, in a case where hot air is to be strongly blown onto a substrate to increase drying intensity, it is necessary to make transport tension high so as to suppress meandering and scratches caused by fluttering of the substrate. In a case where the transport tension is low, problems such as generation of scratches and an increase in meandering amount become apparent, so that product quality cannot be maintained.

SUMMARY OF THE INVENTION

However, in an environment with a temperature gradient difference, there is a problem that a substrate wrinkles in a case where transport tension is high. In the case of JP2012-107792A and JP2018-134792A, such a problem is not solved.

The present invention has been made in consideration of such circumstances and an object thereof is to provide a transport device, a drying device, and a printing apparatus in which a web-shaped substrate is transported without wrinkling even in an environment with a temperature gradient difference.

According to an aspect of the present invention, there is provided a transport device which transports a web-shaped substrate from a first atmosphere of a first atmosphere temperature to a second atmosphere of a second atmosphere temperature different from the first atmosphere temperature along a transport path, the transport device including a plurality of pass rollers that are disposed in the transport path and that each support the substrate, and a plurality of heaters that heat the plurality of pass rollers respectively, in which the plurality of heaters perform heating such that the closer a pass roller is to an upstream side of the transport path, the closer a temperature to which the pass roller is heated is to the first atmosphere temperature and the closer a pass roller is to a downstream side of the transport path, the closer a temperature to which the pass roller is heated is to the second atmosphere temperature.

According to the aspect, the plurality of heaters perform heating such that the closer a pass roller is to an upstream side of the transport path, the closer a temperature to which the pass roller is heated is to the first atmosphere temperature and the closer a pass roller is to a downstream side of the transport path, the closer a temperature to which the pass roller is heated is to the second atmosphere temperature. Therefore, the web-shaped substrate can be transported without wrinkling even in an environment with a temperature gradient difference.

It is preferable that the transport device further includes a memory that stores a command that a processor executes, the processor that executes the command stored in the memory, and a thermometer that measures a surface temperature of the substrate and that the processor controls the heater based on a measurement result of the thermometer to adjust a surface temperature of the pass roller. Accordingly, the surface temperature of the pass roller can be appropriately adjusted.

It is preferable that the processor controls the heater and adjusts the surface temperature of the pass roller such that t satisfies $\Delta L(T)-\Delta L(t)\leq 2.3$ mm in a case where the second atmosphere temperature is lower than the first atmosphere temperature and that the processor controls the heater and adjusts the surface temperature of the pass roller such that t satisfies $\Delta L(t)-\Delta L(T)\leq 2.3$ mm in a case where the second atmosphere temperature is higher than the first atmosphere temperature, where T (unit: ° C.) is the temperature of the substrate, t (unit: ° C.) is the surface temperature of the pass roller, and $\Delta L(T)$ and $\Delta L(t)$ (unit: mm) are amounts of expansion of the substrate at temperatures of T° C. and t° C., respectively. Accordingly, the surface temperature of the pass roller can be appropriately adjusted.

It is preferable that the transport device further includes a plurality of thermometers each of which is disposed between the plurality of pass rollers in the transport path and that the processor adjusts the surface temperature of each of the plurality of pass rollers based on a measurement result of the thermometer disposed upstream of each pass roller. Accordingly, the surface temperatures of the plurality of pass rollers can be appropriately adjusted.

It is preferable that the thermometer performs measurement without coming into contact with the substrate. Accordingly, it is possible to measure the surface temperature of the substrate without causing scratches on the substrate.

It is preferable that the heater includes a hot air heater that blows hot air toward the pass roller. The heater may heat the pass roller from the inside of the pass roller. Accordingly, the pass roller can be appropriately heated.

It is preferable that the transport device further include a spot cooler that blows cooling air toward the substrate in a case where the second atmosphere temperature is lower than the first atmosphere temperature. Accordingly, it is possible to shorten a time taken for the substrate to reach the second atmosphere temperature.

According to an aspect of the present invention, there is provided a drying device including the transport device described above and a drying heater that is disposed in the first atmosphere or the second atmosphere and that heats the substrate.

According to the aspect, the web-shaped substrate can be dried by the drying heater and can be transported without wrinkling even in an environment with a temperature gradient difference.

According to an aspect of the present invention, there is provided a printing apparatus including the transport device described above, a liquid applying head that is disposed in the first atmosphere and that applies liquid to a surface of the substrate, and a drying heater that is disposed in the second atmosphere and that heats the substrate, in which he plurality of pass rollers are disposed between the liquid applying head and the drying heater.

According to the aspect, the web-shaped substrate with a surface onto which liquid has been applied can be dried by the drying heater and can be transported without wrinkling even in an environment with a temperature gradient difference.

According to an aspect of the present invention, there is provided a printing apparatus including the transport device described above a liquid applying head that is disposed upstream of the first atmosphere in the transport path and that applies liquid to a surface of the substrate, and a drying heater that is disposed in the first atmosphere and that heats the substrate, in which the plurality of pass rollers are disposed in the second atmosphere.

According to the aspect, the web-shaped substrate with a surface onto which liquid has been applied can be dried by the drying heater and can be transported without wrinkling even in an environment with a temperature gradient difference.

According to the present invention, a web-shaped substrate can be transported without wrinkling even in an environment with a temperature gradient difference.

BRIEF DESCRIPTION OF THE DRAWINGS

FIG. 7 is a table showing the results of examples in the transport device.

FIG. 8 is a table showing the results of the examples in the transport device.

FIG. 10 is a view showing a configuration of a transport device according to a third embodiment.

FIG. 11 is a table showing the relationship between an elapsed time since transportation of a substrate from a drying unit and the temperature of the substrate.

FIG. 12 is an overall configuration view of an ink jet printing apparatus to which the transport device according to the first embodiment and the transport device according to the second embodiment are applied.

DESCRIPTION OF THE PREFERRED EMBODIMENTS

Hereinafter, preferable embodiments of the present invention will be described in detail with reference to the attached drawings.

<Configuration of Drying Device>

Figure 1:
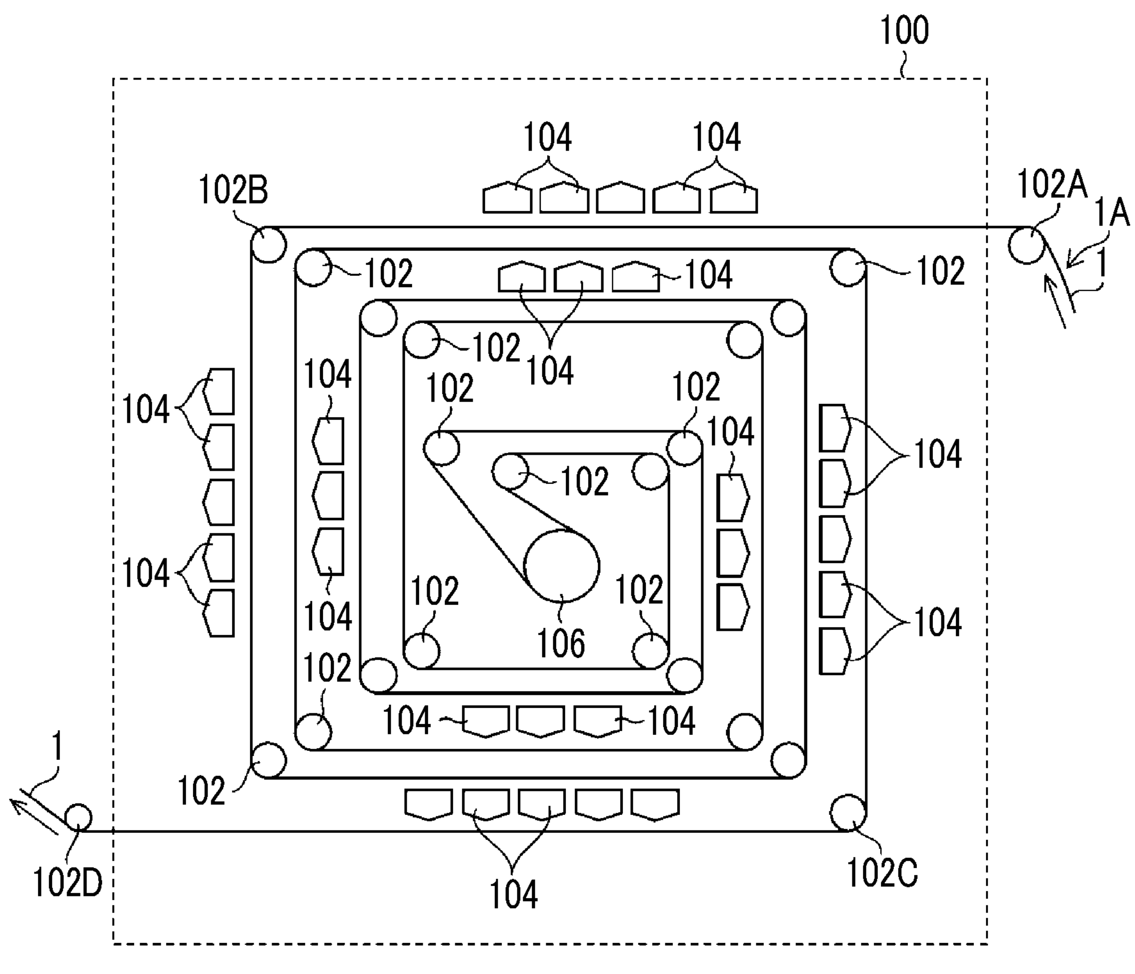
FIG. 1 is a view showing a configuration of a drying device.

FIG. 1 is a view showing a configuration of a drying device 100. The drying device 100 is a device that dries a web-shaped substrate 1 with aqueous ink applied to a printing surface 1A of the substrate 1 while transporting the substrate 1, the substrate 1 being an impermeable medium. The substrate 1 is a transparent medium used for soft packaging. The substrate 1 is, for example, oriented nylon (ONY), oriented polypropylene (OPP), or polyethylene terephthalate (PET).

Note that, being impermeable means being impermeable to aqueous primer and aqueous ink which will be described later. Soft packaging means packaging performed by using a material that is deformed depending on the shape of an article to be packaged. Being transparent means having a visible light transmittance equal to or higher than 30% and equal to or lower than 100%, preferably a visible light transmittance equal to or higher than 70% and equal to or lower than 100%.

As shown in FIG. 1, the drying device 100 includes a plurality of pass rollers 102, a plurality of hot air heaters 104, and a first-touch roller 106.

The substrate 1 guided from a pass roller 102A on an inlet side (an upstream side of a transport path of the substrate 1) of the drying device 100 is transported to the inside of the drying device 100. The drying device 100 includes the plurality of pass rollers 102 that function as guide rollers. In the drying device 100, the substrate 1 guided from the pass roller 102A is guided by the plurality of pass rollers 102 and is transported to the first-touch roller 106.

The plurality of hot air heaters 104 (an example of a drying heater) are disposed in the transport path from the inlet of the drying device 100 to the first-touch roller 106. Each of the hot air heaters 104 is disposed such that an air blowing surface faces the printing surface 1A of the substrate 1. Each of the hot air heaters 104 blows hot air toward the printing surface 1A of the substrate 1 to dry the aqueous ink applied to the printing surface 1A.

The first-touch roller 106, which functions as a sub-feed roller, is rotated by a motor (not shown) and comes into contact with the substrate 1, on which the aqueous ink is dried, to transport the substrate 1.

In addition, in the drying device 100, the substrate 1 transported by the first-touch roller 106 is guided by the plurality of pass rollers 102 and is transported to a pass roller 102D on an outlet side (a downstream side of the transport path of the substrate 1) of the drying device 100.

<Generation of Wrinkles>

Figure 2:
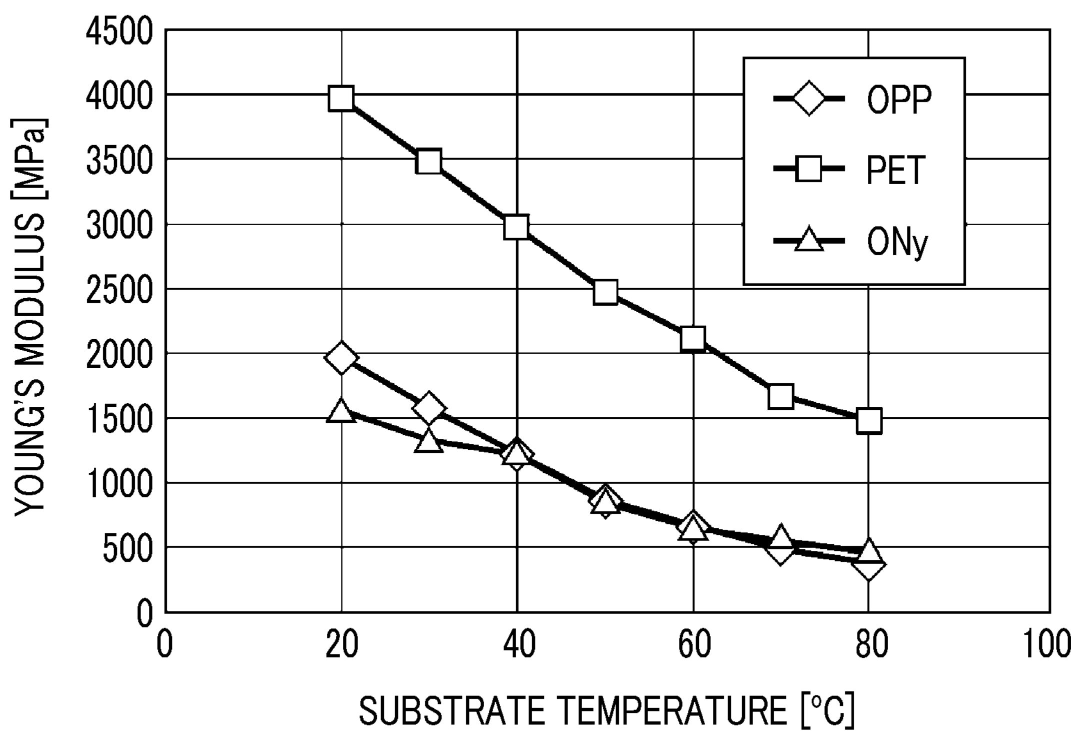
FIG. 2 is a graph showing a change in Young's modulus with respect to the temperature of an impermeable substrate.

FIG. 2 is a graph showing a change in Young's modulus with respect to the temperature of an impermeable substrate. The horizontal axis of FIG. 2 represents the temperature of the substrate, and the vertical axis represents Young's modulus (unit: MPa). FIG. 2 shows OPP, PET, and ONY as examples of impermeable substrates. For example, in the case of the OPP, the Young's modulus at 20° C. is about 2000 MPa and the Young's modulus at 80° C. is about 400 MPa. As described above, there is a type of impermeable substrate having physical properties in which the Young's modulus significantly decreases in a case where the temperature rises, and wrinkles are generated in the case of a high transport tension.

In addition, the pass roller 102A (refer to FIG. 1) which is disposed upstream of the drying device 100 in the transport path of the substrate 1 and the pass roller 102D (refer to FIG. 1) which is disposed downstream of the drying device 100 in the transport path of the substrate 1 are at a normal temperature but the temperatures of a pass roller 102B and a pass roller 102C (refer to FIG. 1) disposed inside the drying device 100 rise because of the influence of hot air of the hot air heaters 104. For this reason, there is a difference in the amount of expansion of the substrate 1 caused by a temperature gradient. Therefore, on the pass roller 102D, the substrate 1 cannot be fully stretched in a width direction orthogonal to a transport direction and wrinkles, for example.

Figure 3:
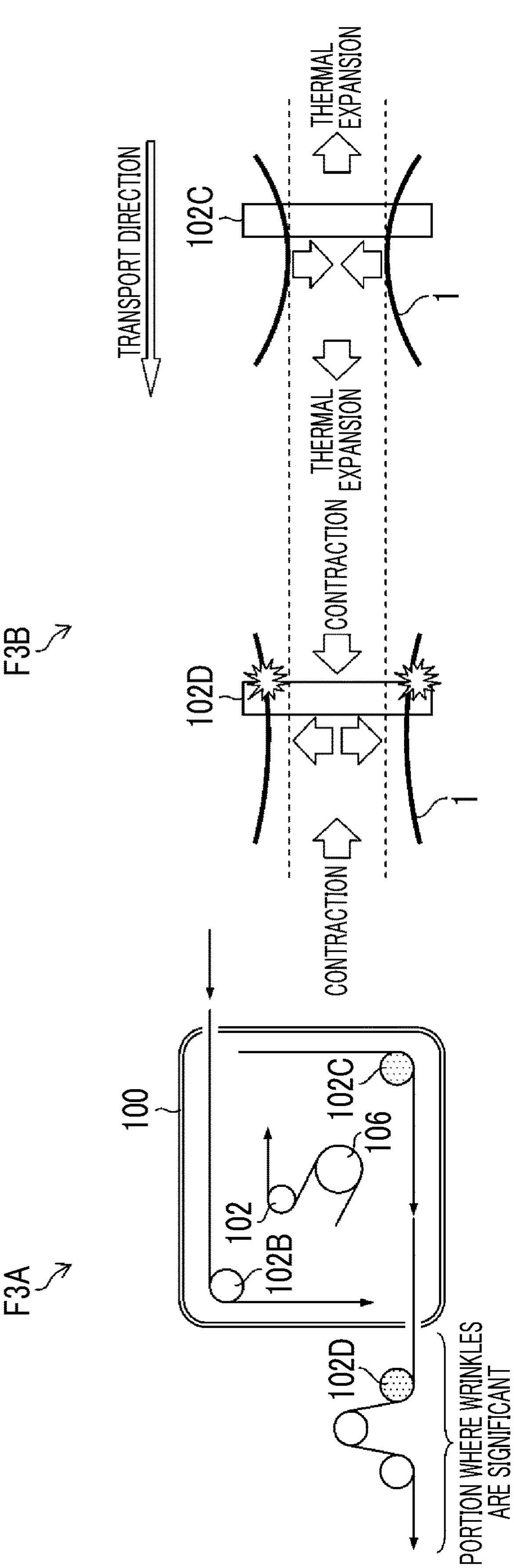
FIG. 3 is a view for description of the way in which wrinkles are generated because of a temperature gradient difference.

FIG. 3 is a view for description of the way in which wrinkles are generated because of a temperature gradient difference. F3A in FIG. 3 is a side view simply showing the drying device 100 and the pass roller 102D disposed downstream of the drying device 100. F3B in FIG. 3 is a top view showing the pass roller 102C and the pass roller 102D in the drying device 100.

As shown in F3B, the substrate 1 supported and transported by the pass roller 102C is thermal-expanded in the transport direction and contracts in the width direction because of heat of a surface of the pass roller 102C heated by the hot air heaters 104 (refer to FIG. 1) and a transport tension acting in the transport direction (advance direction). On the other hand, the substrate 1 supported and transported by the pass roller 102D contracts in the transport direction and is expanded in the width direction by being cooled by a surface of the pass roller 102D which is at the normal temperature.

In this way, wrinkles are generated because of a difference in amount of expansion of the substrate 1 in the transport direction caused by the temperature gradient. Such a problem is more likely to become apparent as the transport tension is made higher, and in a case where the substrate 1 that is formed of OPP and has a thickness of 20 μm is transported, wrinkles are generated at a space (refer to FIG. 1) between the pass roller 102A and the pass roller 102B and a space between the pass roller 102C and the pass roller 102D where temperature gradient differences are large, for example.

In particular, in a case where wrinkles are generated at the space between the pass roller 102C and the pass roller 102D, the substrate 1 is wound with wrinkles thereon since a distance to a position where the substrate 1 is wound is short. Therefore, quality acceptable for shipment cannot be maintained.

First Embodiment

[Configuration of Transport Device]

Figure 4:
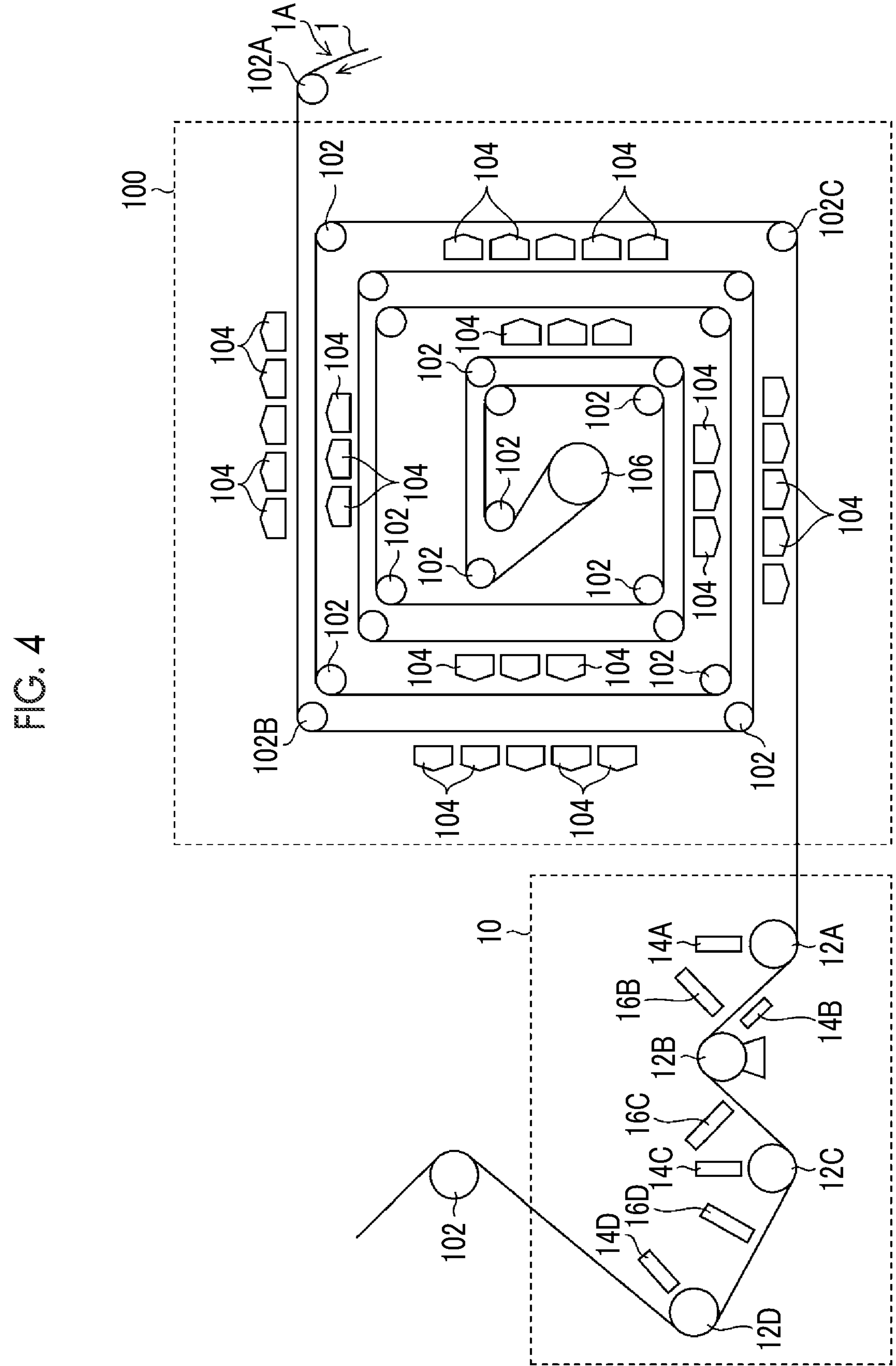
FIG. 4 is a view showing a configuration of a transport device according to a first embodiment.

FIG. 4 is a view showing a configuration of a transport device 10 according to a first embodiment. In an environment that is positioned downstream of the drying device 100 and in which a temperature gradient difference exists, the transport device 10 gradually lowers a substrate temperature while measuring the substrate temperature so as to prevent wrinkles. That is, transportation is performed along the transport path from an atmosphere (an example of a first atmosphere) inside the drying device 100 in which the temperature is relatively high (a first atmosphere temperature) to an atmosphere (an example of a second atmosphere) outside the drying device 100 in which the temperature is a normal temperature which is relatively low (a second atmosphere temperature).

As shown in FIG. 4, the transport device 10 includes pass rollers 12A, 12B, 12C, and 12D, hot air heaters 14A, 14B, 14C, and 14D, and membrane surface thermometers 16B, 16C, and 16D.

The pass rollers 12A, 12B, 12C, and 12D (an example of a plurality of pass rollers) are consecutively disposed along the transport path of the substrate 1 to support and guide the substrate 1. Note that, the pass roller 12B also serves as a tension pickup roller that detects the transport tension of the substrate 1. The transport tension is a tensile force that the substrate 1 receives in the transport direction. Surfaces of the pass rollers 12A, 12B, 12C, and 12D are preferably low-friction members in the viewpoint of not causing wrinkles on the substrate 1. For example, the friction coefficients of the surfaces of the pass rollers 12A, 12B, 12C, and 12D are preferably 0.4 or less, and more preferably 0.3 or less.

Note that, although a configuration in which the four pass rollers 12A, 12B, 12C, and 12D are used has been described here, the number of pass rollers can be determined as appropriate.

The substrate 1 transported to the pass roller 12D is delivered to the pass roller 102 that is disposed downstream of the transport device 10.

The hot air heaters 14A, 14B, 14C, and 14D (an example of a plurality of heaters) are disposed such that the air blowing surfaces face the surfaces (transportation surfaces) of the pass rollers 12A, 12B, 12C, and 12D, respectively, and blow hot air to the surfaces of the pass rollers 12A, 12B, 12C, and 12D. The hot air is air having a temperature exceeding the atmosphere temperatures of the pass rollers 12A, 12B, 12C, and 12D.

The hot air heaters 14A, 14B, 14C, and 14D perform heating such that the closer a pass roller, which is one of the pass rollers 12A, 12B, 12C, and 12D, is to an upstream side of the transport path, the closer a temperature, to which the pass roller is heated, is to the atmosphere temperature inside the drying device 100 and the closer a pass roller, which is one of the pass rollers 12A, 12B, 12C, and 12D, is to a downstream side of the transport path, the closer a temperature, to which the pass roller is heated, is to the atmosphere temperature outside the drying device 100. The temperature and air volume of hot air of the hot air heaters 14A, 14B, 14C, and 14D are controlled by a processor 18 (refer to FIG. 5) described later. That is, the pass rollers 12A, 12B, 12C, and 12D include a temperature adjustment mechanism composed of the hot air heaters 14A, 14B, 14C, and 14D.

In the present embodiment, the hot air heaters 14A, 14B, 14C, and 14D are used as the temperature adjustment mechanism of the pass rollers 12A, 12B, 12C, and 12D. However, the present invention is not limited thereto. For example, as a temperature adjustment mechanism, a heater (not shown) may be provided in each of the pass rollers 12A, 12B, 12C, and 12D. The heater may perform electrical heating, may perform circulation of temperature-controlled liquid, or may perform a combination of electrical heating and circulation of temperature-controlled liquid.

The membrane surface thermometers 16B, 16C, and 16D are disposed, in the transport path of the substrate 1, at a space between the pass roller 12A and the pass roller 12B (an example of a space between pass rollers), at a space between the pass roller 12B and the pass roller 12C, and at a space between the pass roller 12C and the pass roller 12D, respectively. The membrane surface thermometers 16B, 16C, and 16D measure the membrane surface temperature of the substrate 1 immediately before contact with the pass rollers 12B, 12C, and 12D, respectively.

In the viewpoint of preventing scratches on the substrate 1, each of the membrane surface thermometers 16B, 16C, and 16D is preferably a noncontact thermometer that measures the membrane surface temperature of the substrate 1 without coming into contact with the substrate 1. The noncontact thermometer is, for example, a radiation thermometer.

[Electrical Configuration of Transport Device]

Figure 5:
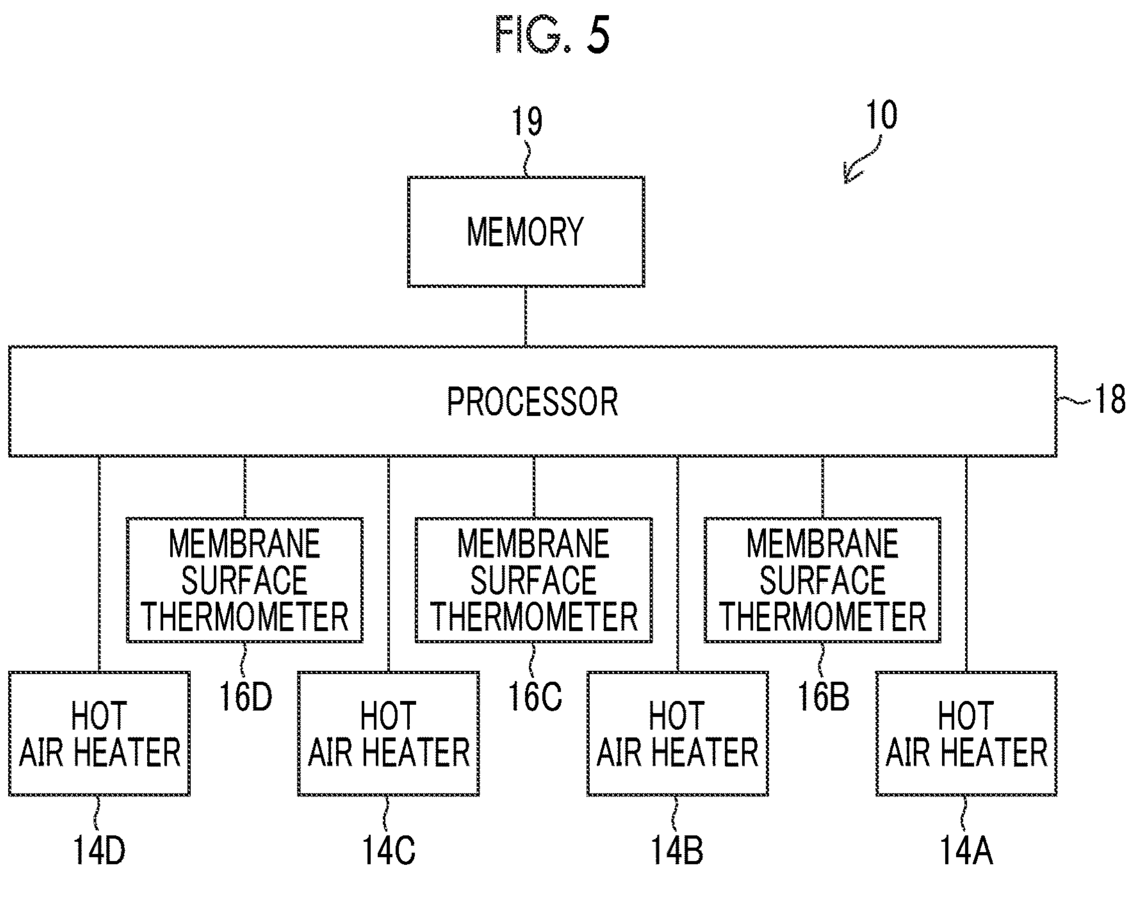
FIG. 5 is a block diagram showing an electrical configuration of the transport device.

FIG. 5 is a block diagram showing an electrical configuration of the transport device 10. As shown in FIG. 5, the transport device 10 includes the processor 18 and a memory 19.

The processor 18 executes a command stored in the memory 19. The hardware structure of the processor 18 is various processors as shown below. The various processors include a central processing unit (CPU), which is a general-purpose processor that executes software (program) and functions as various processing units, a graphics processing unit (GPU), which is a processor specialized in image processing, a programmable logic device (PLD) such as a field programmable gate array (FPGA), which is a processor of which the circuit configuration can be changed after being manufactured, and a dedicated electric circuit such as an application specific integrated circuit (ASIC), which is a processor having a circuit configuration designed only for a specific process.

The processor 18 may be composed of one of the various processors and may be composed of two or more same types of processors or two or more different types of processors (for example, a plurality of FPGAs, a combination of CPU and FPGA, or a combination of CPU and GPU).

Furthermore, the hardware structure of the various processors is, more specifically, an electric circuit (circuitry) in which circuit elements such as semiconductor elements are combined with each other.

The processor 18 adjusts the temperatures of the surfaces of the pass rollers 12A, 12B, 12C, and 12D in accordance with the atmosphere temperature inside the drying device 100 and distances between the pass rollers 12A, 12B, 12C, and 12D to achieve a temperature gradient in which the closer to a surface of a pass roller is to the downstream side of the transport path of the substrate 1, the closer to the temperature of the surface is to the normal temperature. For example, the processor 18 adjusts the temperatures of the surfaces of the pass rollers 12A, 12B, 12C, and 12D to 50° C., 40° C., 30° C., and 20° C., respectively.

In the present embodiment, the processor 18 acquires measurement results of the membrane surface thermometers 16B, 16C, and 16D, and controls the temperature and air volume of the hot air of the hot air heaters 14B, 14C, and 14D based on the measurement results so as to adjust the temperatures of the surfaces of the pass rollers 12A, 12B, 12C, and 12D.

More specifically, the processor 18 measures the membrane surface temperature of the substrate 1 immediately before contact with the pass roller 12B by means of the membrane surface thermometer 16B, and controls the temperature and air volume of the hot air of the hot air heater 14B based on the measurement result so as to adjust the temperature of the surface of the pass roller 12B. In addition, the processor 18 measures the membrane surface temperature of the substrate 1 immediately before contact with the pass roller 12C by means of the membrane surface thermometer 16C, and controls the temperature and air volume of the hot air of the hot air heater 14C based on the measurement result so as to adjust the temperature of the surface of the pass roller 12C. Similarly, the processor 18 measures the membrane surface temperature of the substrate 1 immediately before contact with the pass roller 12D by means of the membrane surface thermometer 16D, and controls the temperature and air volume of the hot air of the hot air heater 14D based on the measurement result so as to adjust the temperature of the surface of the pass roller 12D.

Further, the processor 18 controls the temperature and air volume of the hot air of the hot air heater 14A based on the temperatures of the hot air heaters 104 of the drying device 100 so as to adjust the temperature of the surface of the pass roller 12A. A membrane surface thermometer may be disposed between the drying device 100 and the pass roller 12A to measure the membrane surface temperature of the substrate 1 immediately before contact with the pass roller 12A and to control the temperature and air volume of the hot air of the hot air heater 14A based on the measurement result so as to adjust the temperature of the surface of the pass roller 12A.

A thermometer that measures the temperatures of the surfaces of the pass rollers 12A, 12B, 12C, and 12D may be provided in order to check whether the temperatures of the pass rollers 12A, 12B, 12C, and 12D have been adjusted to desired temperatures. The processor 18 may control the temperature and air volume of the hot air of the hot air heaters 14A, 14B, 14C, and 14D based on the measured temperature of the surfaces of the pass rollers 12A, 12B, 12C, and 12D.

The memory 19 stores a command that the processor 18 executes. The memory 19 may store a table showing a relationship between the measurement results of the membrane surface thermometers 16B, 16C, and 16D and the temperature and air volume of the hot air of the hot air heaters 14B, 14C, and 14D. In this case, the processor 18 can control the temperature and air volume of the hot air of the hot air heaters 14B, 14C, and 14D based on the table stored in the memory 19.

[Details of Temperature Control]

It is desirable that a surface temperature t (unit: ° C.) of a pass roller is the minimum t that satisfies Equation 1 as follows, where T (unit: ° C.) is the temperature of the substrate and ΔL (T) and ΔL (t) are the amounts of expansion (unit: mm) in the transport direction of the substrate at temperatures of T and t, respectively.

$$\Delta L\ (T) - \Delta L\ (t) \leq 2.3\text{ mm} \quad \text{(Equation 1)}$$

Here, 2.3 mm on the right side of Equation 1 was calculated from an experimental result in the case of transportation of the PET substrate 1 having a thickness of 25 μm. In a case where the transport tension was 40 N and a substrate length (a length along the transport path of the substrate 1) was 2000 mm, the amounts of expansion of the PET substrate having a thickness of 25 μm were ΔL (80° C.)=3.68 mm and ΔL (20° C.)=1.38 mm (that is, ΔL (80° C.)−ΔL (20° C.)=2.3 mm) and there were no wrinkles on the substrate 1 caused by the transportation.

In the transport device 10, the processor 18 adjusts the temperatures of the surfaces of the pass rollers 12A, 12B, 12C, and 12D to be the minimum t satisfying Equation 1 so as to suppress wrinkles of the substrate 1.

That is, the processor 18 determines the surface temperature t of the pass roller 12B from Equation 1 while using a temperature measured by the membrane surface thermometer 16B disposed between the pass roller 12A and the pass roller 12B of the transport path of the substrate 1 as the temperature T of the substrate 1. The processor 18 controls the temperature and air volume of the hot air of the hot air heater 14B such that the surface temperature of the pass roller 12B becomes t determined as above. For example, the temperature of hot air of the hot air heater 14B is caused to become t.

In addition, the processor 18 determines the surface temperature t of the pass roller 12C from Equation 1 while using a temperature measured by the membrane surface thermometer 16C as the temperature T of the substrate 1 and controls the temperature and air volume of the hot air of the hot air heater 14C such that the surface temperature of the pass roller 12C becomes t determined as above. Similarly, the processor 18 determines the surface temperature t of the pass roller 12D from Equation 1 while using a temperature measured by the membrane surface thermometer 16D as the temperature T of the substrate 1 and controls the temperature and air volume of the hot air of the hot air heater 14D such that the surface temperature of the pass roller 12D becomes t determined as above.

Note that, although no membrane surface thermometer is disposed upstream of the pass roller 12A, it can be deduced that the temperature of the substrate 1 transported to the pass roller 12A is 60° C., which is the temperature of the hot air of the hot air heaters 104 of the drying device 100, for example. Therefore, the processor 18 determines the surface temperature t of the pass roller 12A from Equation 1 while using 60° C. as the temperature T of the substrate 1 and controls the temperature and air volume of the hot air of the hot air heater 14A such that the surface temperature of the pass roller 12A becomes t determined as above.

Figure 6:
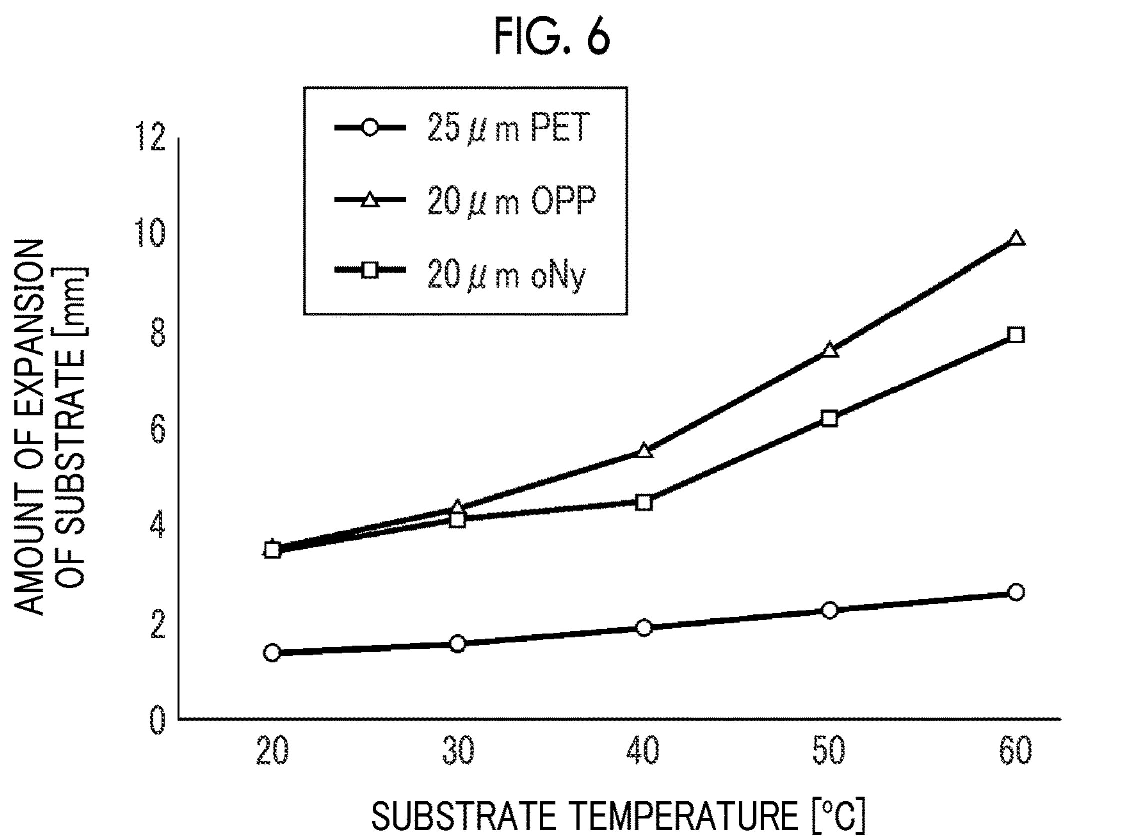
FIG. 6 is a graph showing a change in amount of expansion with respect to the temperature of an impermeable substrate.

FIG. 6 is a graph showing a change in amount of expansion with respect to the temperature of an impermeable substrate. The horizontal axis of FIG. 6 represents the temperature of the substrate, and the vertical axis represents the amount of expansion (unit: mm) related to a case where the transport tension is 40 N and the substrate length is 2000 mm. FIG. 6 shows the cases of a PET substrate having a thickness of 25 μm, an OPP substrate having a thickness of 20 μm, and an ONY substrate having a thickness of 20 μm. It can be found from FIG. 6 that a temperature gradient in which T−t=10° C. or less results in a difference in amount of expansion of the substrate being equal to or lower than 2.3 mm in the cases of OPP and ONY with poor temperature characteristics.

Here, Equation 1 can be expressed as Equation 2 below, where N (unit: N) is a transport tension received by a substrate, L (unit: mm) is a substrate length, A (unit: $mm^2$) is the sectional area of the substrate related to a case where the substrate is cut in a direction orthogonal to the transport direction, and E (unit: $N/mm^2$) is Young's modulus of the substrate.

$$L/AE\,(T)-NL/AE\,(t)\leq 2.3\text{ mm} \quad \text{(Equation 2)}$$

In order that a difference in amount of expansion of the substrate 1 becomes equal to or smaller than 2.3 mm, a function with respect to temperature is defined by Equation 2 under arbitrary transport conditions. Therefore, the transport device 10 and control thereof are applicable to every thermoplastic resin.

In addition, even in the case of the substrate 1 with a significant decrease in Young's modulus with respect to the temperature in comparison with the impermeable substrate shown in FIG. 6, application can be made in the case of a temperature gradient in which a difference in substrate expansion amount can be maintained to be equal to or smaller than 2.3 mm.

EXAMPLES

FIGS. 7 and 8 are tables showing the results of examples in the transport device 10. In FIGS. 7 and 8, "drying temperature" means the atmosphere temperature of the drying device 100 and is equivalent to the temperature of the hot air of the hot air heaters 104. In addition, the atmosphere temperature of the transport device 10 was 20° C.

FIGS. 7 and 8 shows the temperatures of the hot air heaters 14A, 14B, 14C, and 14D in the case of transportation of the substrates 1, which were a PET substrate having a thickness of 25 μm, an OPP substrate having a thickness of 20 μm, a PET substrate having a thickness of 12 μm, and an ONY substrate having a thickness of 16 μm, the transportation being performed in the cases of drying temperatures of 80° C. and 60° C.

FIG. 7 shows a case where the transport tension of the substrates 1 was 40 N. Under all of the conditions shown in FIG. 7, no wrinkles were generated on the substrate 1. For example, no wrinkles were generated on the substrate 1 in a case where the drying temperature was 80° C., the substrate 1 was a PET substrate having a thickness of 25 μm, and the substrate 1 was transported with the temperatures of the hot air heaters 14A, 14B, 14C, and 14D set to 60° C., 40° C., 20° C., and 20° C., respectively.

Meanwhile, FIG. 8 shows a case where the transport tension of the substrates 1 was 20 N. Under all of the conditions shown in FIG. 8 as well, no wrinkles were generated on the substrate 1. For example, no wrinkles were generated on the substrate 1 in a case where the drying temperature was 60° C., the substrate 1 was an ONY substrate having a thickness of 16 μm, and the substrate 1 was transported with the temperatures of the hot air heaters 14A, 14B, 14C, and 14D set to 40° C., 20° C., 20° C., and 20° C., respectively.

That is, under conditions which are the drying temperature, the substrate types, and the transport tensions shown in FIGS. 7 and 8, the temperatures of the surfaces of the pass rollers 12A, 12B, 12C, and 12D that are adjusted by means of the hot air heaters 14A, 14B, 14C, and 14D satisfy Equation 1 with respect to the temperatures of the substrates 1.

Second Embodiment

Figure 9:
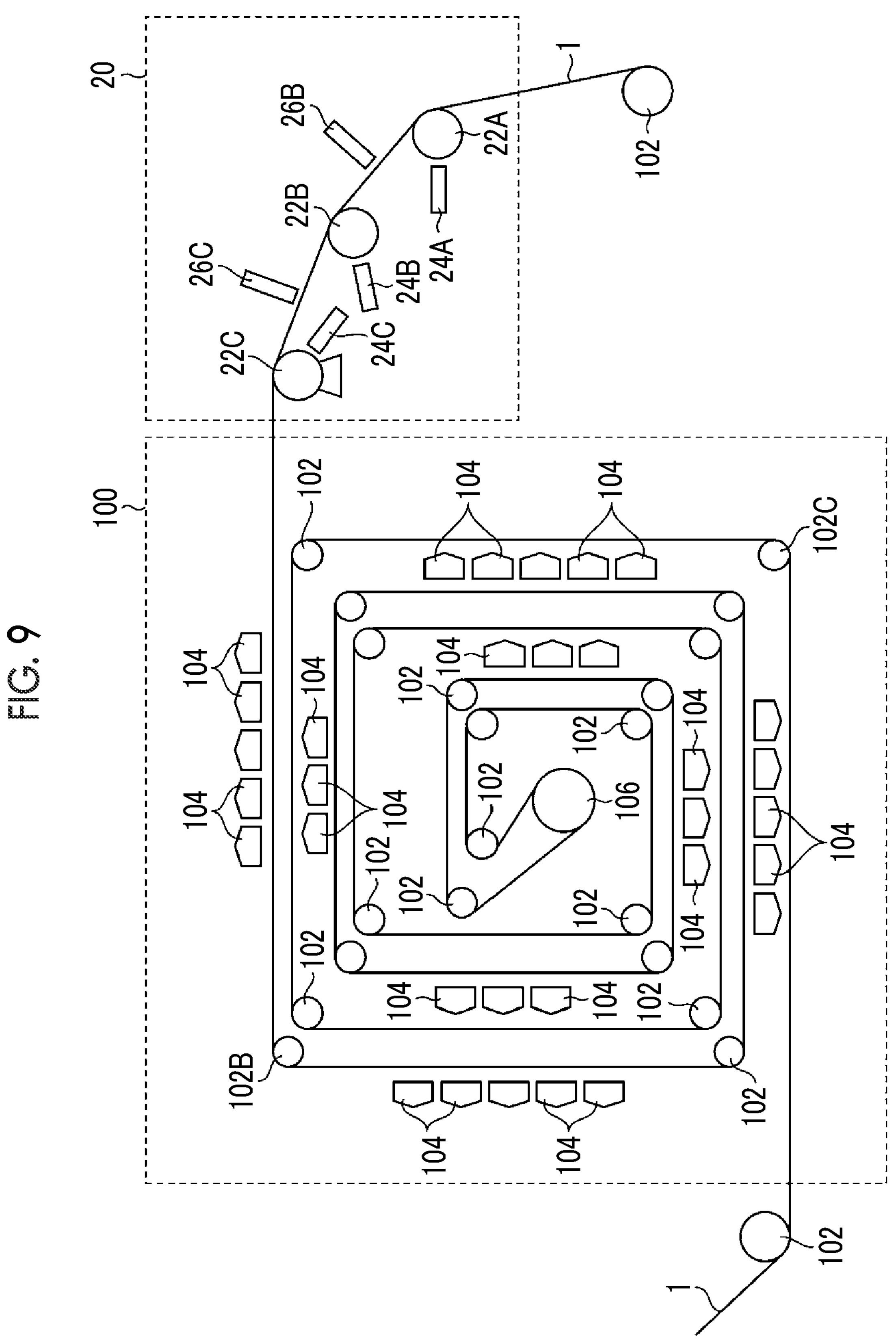
FIG. 9 is a view showing a configuration of a transport device according to a second embodiment.

FIG. 9 is a view showing a configuration of a transport device 20 according to a second embodiment. In an environment that is positioned upstream of the drying device 100 and in which a temperature gradient difference exists, the transport device 20 gradually lowers a substrate temperature while measuring the substrate temperature so as to prevent wrinkles. That is, transportation is performed along the transport path from an atmosphere (an example of a first atmosphere) outside the drying device 100 in which the temperature is a normal temperature which is relatively low (a first atmosphere temperature) to an atmosphere (an example of a second atmosphere) inside the drying device 100 in which the temperature is relatively high (a second atmosphere temperature).

As shown in FIG. 9, the transport device 20 includes pass rollers 22A, 22B, and 22C, hot air heaters 24A, 24B, and 24C, and membrane surface thermometers 26B and 26C.

The pass rollers 22A, 22B, and 22C (an example of a plurality of pass rollers) are consecutively disposed along the transport path of the substrate 1 to guide the substrate 1. Note that, the pass roller 22C also serves as a tension pickup roller that detects the transport tension of the substrate 1. As with the first embodiment, the surfaces of the pass rollers 22A, 22B, and 22C are preferably low-friction members.

Although a configuration in which the three pass rollers 22A, 22B, and 22C are used has been described here, the number of pass rollers can be determined as appropriate in accordance with transport conditions.

The substrate 1 transported to the pass roller 22C is delivered to the pass rollers 102 inside the drying device 100.

The hot air heaters 24A, 24B, and 24C (an example of a plurality of heaters) are disposed such that the air blowing surfaces face the surfaces of the pass rollers 22A, 22B, and 22C, respectively, and blow hot air to the surfaces of the pass rollers 22A, 22B, and 22C. The temperature and air volume of hot air to the pass rollers 22A, 22B, and 22C are controlled by the processor 18 (refer to FIG. 5). That is, the pass rollers 22A, 22B, and 22C include a temperature adjustment mechanism composed of the hot air heaters 24A, 24B, and 24C. As with the first embodiment, the temperature adjustment mechanism is not limited to this example.

The membrane surface thermometers 26B and 26C are disposed, in the transport path of the substrate 1, at a space between the pass roller 22A and the pass roller 22B and at a space between the pass roller 22B and the pass roller 22C, respectively. The membrane surface thermometers 26B and 26C measure the membrane surface temperature of the substrate 1. Each of the membrane surface thermometers 26B and 26C is preferably a noncontact thermometer.

Regarding the electrical configuration of the transport device 20, the hot air heaters 24A, 24B, and 24C and the membrane surface thermometers 26B and 26C are connected to the processor 18 as with the first embodiment.

The processor 18 controls the temperatures of the surfaces of the pass rollers 22A, 22B, and 22C to be the maximum t satisfying Equation 3 below so as to suppress wrinkles of the substrate 1.

$$\Delta L\ (t)-\Delta L\ (T)\leq 2.3\ \text{mm} \quad \text{(Equation 3)}$$

That is, the processor 18 determines the surface temperature t of the pass roller 22B from Equation 3 while using a temperature measured by the membrane surface thermometer 26B disposed between the pass roller 22A and the pass roller 22B of the transport path of the substrate 1 as the temperature T of the substrate 1. The processor 18 controls the temperature and air volume of the hot air of the hot air heater 24B such that the surface temperature of the pass roller 22B becomes t determined as above. For example, it is assumed that the temperature of hot air of the hot air heater 24B is t.

Similarly, the processor 18 determines the surface temperature t of the pass roller 22C from Equation 3 while using a temperature measured by the membrane surface thermometer 26C as the temperature T of the substrate 1 and controls the temperature and air volume of the hot air of the hot air heater 24C such that the surface temperature of the pass roller 22C becomes t determined as above.

Note that, although no membrane surface thermometer is disposed upstream of the pass roller 22A, it can be deduced that the temperature of the substrate 1 transported to the pass roller 22A is 20° C., which is a normal temperature. Therefore, the processor 18 determines the surface temperature t of the pass roller 22A from Equation 3 while using 20° C. as the temperature T of the substrate 1 and controls the temperature and air volume of the hot air of the hot air heater 24A such that the surface temperature of the pass roller 22A becomes t determined as above.

Note that, Equation 3 can be expressed as Equation 4 as follows.

$$NL/AE\ (t)-NL/AE\ (T)\leq 2.3\ \text{mm} \quad \text{(Equation 4)}$$

As described above, wrinkles of the substrate 1 can be suppressed by providing the same configuration on the inlet side of the drying device 100. As a result, the flatness of the surface of the substrate 1 is ensured, so that a drying efficiency increasing effect may also be achieved.

Third Embodiment

Figure 10:
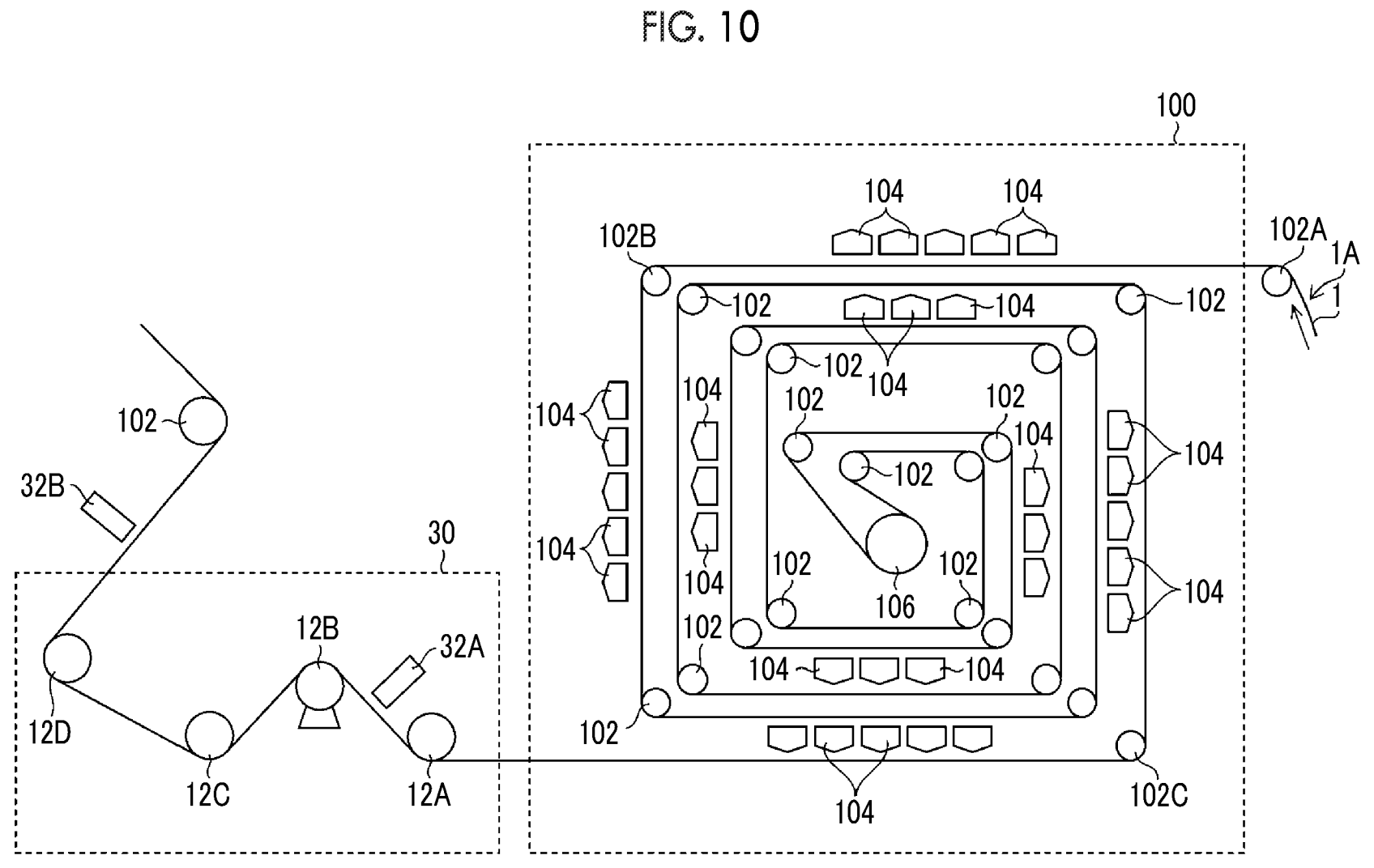

FIG. 10 is a view showing a configuration of a transport device 30 according to a third embodiment. As shown in FIG. 10, the transport device 30 includes the pass rollers 12A, 12B, 12C, and 12D and spot coolers 32A and 32B. Note that, as with the first embodiment, the transport device 30 may include the hot air heaters 14A, 14B, 14C, and 14D and the membrane surface thermometers 16B, 16C, and 16D.

The spot coolers 32A and 32B are disposed such that air blowing surfaces face the substrate 1 and blow cooling air to the substrate 1. The cooling air is air of which the temperature is lower than the atmosphere temperature of the substrate 1. Here, each of the spot coolers 32A and 32B blows cooling air of 10° C.

Calculation of a time taken for temperature drop caused by natural heat dissipation in the transport device 10 shows that it takes 10 seconds for the substrate 1 at 60° C. to reach 23° C. which is a normal temperature. Therefore, in a case where the maximum speed of transportation needs to be 100 m/min, a cooling distance of about 16 m is required to perform transportation while preventing wrinkles by means of natural heat dissipation only. Since a pass roller of which temperature has not been adjusted cannot be disposed while the substrate 1 is being cooled, the substrate 1 is likely to meander, which not only makes a transport system considerably unstable but also increases the size of the device.

Therefore, the transport device 30 includes the spot coolers 32A and 32B so that the number of pass rollers for temperature adjustment and the cooling distance are reduced. FIG. 11 is a table showing the relationship between an elapsed time since transportation of the substrate 1 from the drying device 100 and the temperature of the substrate 1. FIG. 11 shows the case of natural heat dissipation and the case of use of the spot coolers 32A and 32B. As shown in FIG. 11, although an elapsed time taken for the substrate 1 at 60° C. transported from the drying device 100 to be cooled to 23° C., which is a normal temperature, via natural heat dissipation is 10 seconds, an elapsed time taken for the substrate 1 at 60° C. transported from the drying device 100 to be cooled to 23° C. in a case where the spot coolers 32A and 32B are used is 3 seconds. Therefore, it is possible to reduce a time required to cool the substrate 1 by 7 seconds.

As described above, in a case where the substrate 1 is cooled by the spot coolers 32A and 32B, a time taken for the substrate 1 to be cooled to a normal temperature can be reduced and thus the number of pass rollers for temperature adjustment and the cooling distance can be reduced.

Note that, although a configuration in which the two spot coolers 32A and 32B are used has been described here, only one spot cooler may be used or three or more spot coolers may be used. In addition, the temperature and air volume of the cooling air can also be determined as appropriate.

<Printing Apparatus>

[Configuration of Ink Jet Printing Apparatus]

Figure 12:
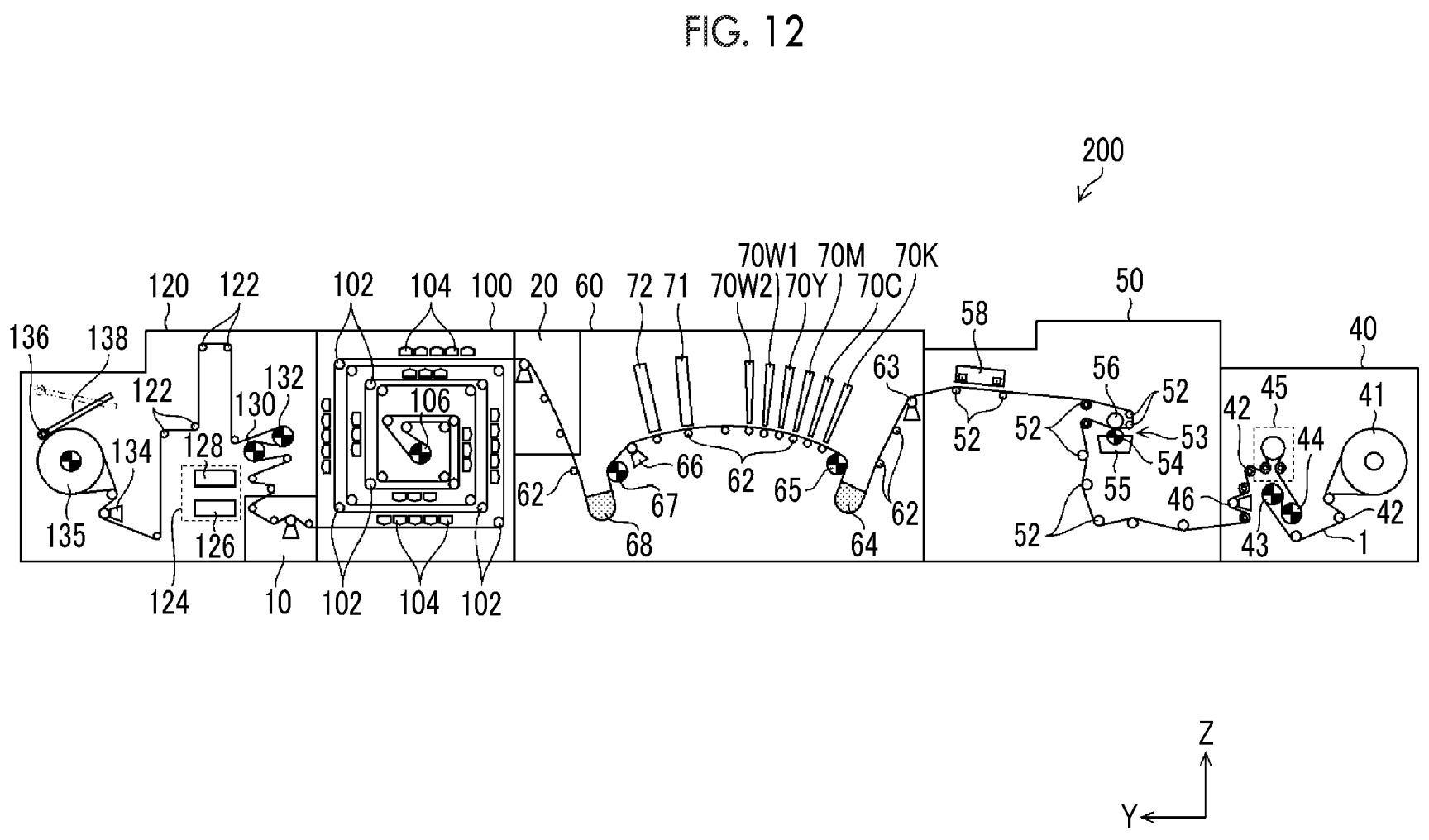

FIG. 12 is an overall configuration view of an ink jet printing apparatus 200 to which the transport device 10 and the transport device 20 are applied. The ink jet printing apparatus 200 is a printing apparatus that prints an image on the substrate 1 by a single-pass method. The ink jet printing apparatus 200 produces a back-printing printed matter of which a printing target can be visually recognized from a side opposite to a printing surface with respect to the substrate 1.

As shown in FIG. 12, the ink jet printing apparatus 200 includes an unwinding unit 40, a pre-coating unit 50, a jetting unit 60, the drying device 100, and a winding unit 120.

[Unwinding Unit]

The unwinding unit 40 includes an unwinding roll 41, a drive roller 43, a drive roller 44, and a corona treatment unit 45. The unwinding roll 41 includes a reel (not shown) that is rotatably supported. The substrate 1 before printing of an image is wound on the reel in a roll shape. A plurality of pass rollers 42 that function as guide rollers are disposed along the transport path of the substrate 1. The substrate 1 unwound from the unwinding roll 41 is transported to the drive roller 43 by being guided by the plurality of pass rollers 42.

The drive roller 43, which functions as a sub-feed roller, is rotated by a motor (not shown) and comes into contact with the substrate 1 to transport the substrate 1. The substrate 1 transported by the drive roller 43 is transported to the drive roller 44. The drive roller 44 is rotated by a motor (not shown) and comes into contact with the substrate 1 to transport the substrate 1.

The substrate 1 transported by the drive roller 44 is transported to a position facing the corona treatment unit 45.

The corona treatment unit 45 is disposed upstream of the pre-coating unit 50 in the transport path. The corona treatment unit 45 performs corona discharge treatment on a printing surface of the substrate 1 for reforming and improves adhesiveness between the water-repellent printing surface, aqueous primer, and aqueous ink.

The substrate 1 of which the printing surface has been subjected to reforming is guided by the pass rollers 42 to be transported to a tension pickup roller 46. The substrate 1 of which the transport tension has been detected by the tension pickup roller 46 is guided by the pass rollers 42 to be transported from the unwinding unit 40 to the pre-coating unit 50.

[Pre-Coating Unit]

The pre-coating unit 50 is disposed upstream of the jetting unit 60 in the transport path. The pre-coating unit 50 applies aqueous primer to the printing surface of the substrate 1. The aqueous primer is a liquid containing water and a component that aggregates, insolubilizes, or thickens a coloring material component in aqueous ink, and is thickened by reaction between aqueous color ink and aqueous white ink.

The pre-coating unit 50 includes a plurality of pass rollers 52, a coater 53, and a pre-coating (PC) drying unit 58. The plurality of pass rollers 52 are disposed along the transport path of the substrate 1. The substrate 1 transported from the unwinding unit 40 to the pre-coating unit 50 is guided by the plurality of pass rollers 52 to be transported to a position facing the coater 53.

The coater 53 is a chamber doctor type coater. The coater 53 includes a coating roller 54, a chamber 55, an opposing roller 56, and a blade (not shown). The coating roller 54, which functions as a sub-feed roller, is rotated by a motor (not shown). Aqueous primer is stored in the chamber 55. The coater 53 supplies aqueous primer from the chamber 55 to a surface of the coating roller 54 that rotates. The blade scrapes off surplus aqueous primer on the surface of the rotating coating roller 54. The coating roller 54 sandwiches the substrate 1 with the opposing roller 56 and causes the surface to which the aqueous primer is supplied abuts onto the printing surface of the substrate 1 so that the printing surface of the substrate 1 is coated with the aqueous primer supplied to the surface.

The substrate 1 coated with the aqueous primer is guided by the plurality of pass rollers 52 to be transported to a position facing the PC drying unit 58.

The PC drying unit 58 includes a hot air heater (not shown). The hot air heater includes two slit nozzles (not shown) that extend over the entire width of the substrate 1. The PC drying unit 58 blows hot air from the slit nozzles of the hot air heater toward the printing surface of the substrate 1 so as to dry the aqueous primer.

The substrate 1 on which the aqueous primer is dried is transported from the pre-coating unit 50 to the jetting unit 60.

[Jetting Unit]

The jetting unit 60 prints an image on the printing surface of the substrate 1. The jetting unit 60 manages the temperature of the substrate 1 to be a normal temperature in the viewpoint of maintaining printing quality. The jetting unit 60 includes a plurality of pass rollers 62, a contactless turn unit 64, a suction drum 65, a suction drum 67, a contactless turn unit 68, and ink jet heads 70K, 70C, 70M, 70Y, 70W1, and 70W2, a scanner 71, and a scanner 72.

The plurality of pass rollers 62 are disposed along the transport path of the substrate 1. The substrate 1 transported from the pre-coating unit 50 to the jetting unit 60 is transported to a tension pickup roller 63. The substrate 1 of which the transport tension has been detected by the tension pickup roller 63 is guided by the plurality of pass rollers 62 to be transported to the contactless turn unit 64.

The contactless turn unit 64 causes the substrate 1 to float from the contactless turn unit 64 by a predetermined floating amount and turns a direction that the transport path of the substrate 1 extends by 180 degrees to be changed from a downward direction to an upward direction. The amount of air blown by the contactless turn unit 64 is controlled by an air volume control unit (not shown). The substrate 1 turned by the contactless turn unit 64 is transported to the suction drum 65.

The suction drum 65 is disposed upstream of the ink jet heads 70K, 70C, 70M, 70Y, 70W1, and 70W2 in the transport path.

The suction drum 65, which functions as a main feed roller, is rotated by a motor (not shown) and transports the substrate 1 with the substrate 1 adsorbed onto an outer peripheral surface. The suction drum 65 includes a plurality of suction holes (not shown) in the outer peripheral surface. The suction drum 65 adsorbs the substrate 1 onto the outer peripheral surface with the suction holes sucked by a pump (not shown).

The substrate 1 transported by the suction drum 65 is supported and guided by the plurality of pass rollers 62 to be transported to a tension pickup roller 66, the pass rollers 62 being disposed at regular intervals along the transport path. The substrate 1 of which the transport tension has been detected by the tension pickup roller 66 is transported to the suction drum 67.

The suction drum 67 that functions as a sub-feed roller is disposed downstream of the ink jet heads 70K, 70C, 70M, 70Y, 70W1, and 70W2 in the transport path and is disposed upstream of the drying device 100 in the transport path. The suction drum 67 is rotated by a motor (not shown) and transports the substrate 1 with the substrate 1 adsorbed onto an outer peripheral surface. The configuration of the suction drum 67 is the same as that of the suction drum 65.

The ink jet heads 70K, 70C, 70M, 70Y, 70W1, and 70W2, the scanner 71, and the scanner 72 are disposed between the suction drum 65 and the suction drum 67 in the transport path.

The substrate 1 transported from the suction drum 65 is transported to a position facing the ink jet heads 70K, 70C, 70M, and 70Y.

The ink jet heads 70K, 70C, 70M, and 70Y (an example of liquid applying heads) jets aqueous ink of black (K), cyan (C), magenta (M), and yellow (Y), respectively. The aqueous ink is ink in which a coloring material such as a dye or a pigment is dissolved or dispersed in water and a solvent soluble in water. The aqueous ink is supplied to each of the ink jet heads 70K, 70C, 70M, and 70Y from an ink tank of a corresponding color (not shown) via a pipe path (not shown).

Each of the ink jet heads 70K, 70C, 70M, and 70Y is composed of a line-type recording head that can perform printing with the substrate 1 transported once. A nozzle surface (not shown) of each of the ink jet heads 70K, 70C, 70M, and 70Y is disposed to face the pass roller 62. That is, the ink jet heads 70K, 70C, 70M, and 70Y are disposed at regular intervals along the transport path.

A plurality of nozzles, which are aqueous ink outlets, are two-dimensionally arranged at each of the nozzle surfaces of the ink jet heads 70K, 70C, 70M, and 70Y The nozzle surface refers to a jetting surface at which the nozzles are formed. A water-repellent film is formed on each of the nozzle surfaces of the ink jet heads 70K, 70C, 70M, and 70Y.

Each of the ink jet heads 70K, 70C, 70M, and 70Y can be configured by connecting a plurality of head modules in the width direction of the substrate 1.

Aqueous ink droplets are jetted from at least one of the ink jet heads 70K, 70C, 70M, or 70Y to the printing surface of the substrate 1 transported along the plurality of pass rollers 62, so that the jetted droplets adhere to the substrate 1 and an image is printed on the printing surface of the substrate 1.

Although a configuration in which aqueous ink of four colors is used has been described here, the colors of the ink and the number of colors are not limited to those in the present embodiment. In addition, the order in which the ink jet heads for the respective colors are disposed is not limited.

The substrate 1 on which a color image has been printed by the ink jet heads 70K, 70C, 70M, and 70Y is transported to a position facing the ink jet heads 70W1 and 70W2.

The ink jet heads 70W1 and 70W2 are disposed downstream of the ink jet heads 70K, 70C, 70M, and 70Y in the transport path. Each of the ink jet heads 70W1 and 70W2 coats the printing surface of the substrate 1 with aqueous white ink to print a white background image.

The configurations of the ink jet heads 70W1 and 70W2 are the same as those of the ink jet heads 70K, 70C, 70M, and 70Y. White aqueous ink is supplied to each of the ink jet heads 70W1 and 70W2 from an ink tank (not shown) via a pipe path (not shown). A nozzle surface (not shown) of each of the ink jet heads 70W1 and 70W2 is disposed to face the plurality of pass rollers 62. The ink jet heads 70W1 and 70W2 are disposed at a regular interval along the transport path.

Aqueous white ink droplets are jetted from at least one of the ink jet heads 70W1 or 70W2 to the printing surface of the substrate 1 transported along the plurality of pass rollers 62, so that the jetted droplets adhere to the substrate 1 and the white background image is printed on the printing surface of the substrate 1.

Note that, although a configuration in which the two ink jet heads 70W1 and 70W2 are used has been described here, only one ink jet head may be used or three or more ink jet heads may be used.

A condensation thickening reaction of the aqueous color ink and the aqueous white ink with which the printing surface of the substrate 1 is coated in the jetting unit 60 is caused by the aqueous primer with which the printing surface of the substrate 1 is coated in the pre-coating unit 50.

The substrate 1 on which the white background image has been printed by the ink jet heads 70W1 and 70W2 is guided by the pass rollers 62 to be transported to a position facing the scanner 71 and the scanner 72.

The scanner 71 and the scanner 72 examine a test pattern image such as a nozzle check pattern printed on the substrate 1 at the ink jet heads 70K, 70C, 70M, 70Y, 70W1, and 70W2. The scanner 71 and the scanner 72 include an image pick-up device that images a test pattern image printed on the printing surface of the substrate 1 and converts the image into an electric signal. A color charge coupled device (CCD) linear image sensor can be used as the image pick-up device. A color complementary metal oxide semiconductor (CMOS) linear image sensor can also be used instead of the color CCD linear image sensor.

Each of the scanner 71 and the scanner 72 is disposed closer to the printing surface of the substrate 1 and reads the test pattern image printed on the printing surface of the substrate 1 from the printing surface side. Regarding the test pattern image read by the scanner 71 and the scanner 72, determination is performed by a determination unit (not shown) to specify a defective nozzle or the like.

The substrate 1 of which the test pattern image has been examined by the scanner 71 and the scanner 72 is guided downward by the suction drum 67 and is transported to the contactless turn unit 68.

The contactless turn unit 68 is disposed between the suction drum 67 and the drying device 100 in the transport path. The contactless turn unit 68 changes a direction that the transport path extends from a downward direction to an upward direction without coming into contact with the printing surface of the substrate 1. The configuration of the contactless turn unit 68 is the same as that of the contactless turn unit 64. The contactless turn unit 68 causes the substrate 1 to float from the contactless turn unit 68 by a predetermined floating amount and turns the substrate 1 by 180 degrees. In the case of the contactless turn unit 68, there is no influence on an image printed on the printing surface since the contactless turn unit 68 does not come into contact with the printing surface.

The amount of air blown by the contactless turn unit 68 is controlled by an air volume control unit (not shown). In addition, the contactless turn unit 68 may include a temperature adjustment device that adjusts the temperature of air that the contactless turn unit 68 blows.

The substrate 1 turned by the contactless turn unit 68 is guided by the pass rollers 62 to be transported to the transport device 20. The configuration of the transport device 20 is the same as that in FIG. 9.

The substrate 1 of which the transport tension has been detected by the pass roller 22C which also serves as the tension pickup roller is transported from the transport device 20 to the drying device 100.

[Drying Device]

The drying device 100 is disposed downstream of the jetting unit 60 in the transport path. The drying device 100 dries the aqueous ink with which the printing surface of the substrate 1 is coated. The atmosphere temperature inside the drying device 100 is higher than a normal temperature and is, for example, 60° C.

The configuration of the drying device 100 is the same as that in FIG. 1. The substrate 1 transported by the drying device 100 is transported to the winding unit 120 via the transport device 10. The configuration of the transport device 10 is the same as that in FIG. 4. The transport device 30 may be applied instead of the transport device 10.

[Winding Unit]

The atmosphere temperature of the winding unit 120 is a normal temperature. The winding unit 120 includes a plurality of pass rollers 122, an inspection unit 124, a drive roller 130, a drive roller 132, a winding roll 135, and a retaining roller 136. The plurality of pass rollers 122 are disposed along the transport path of the substrate 1.

The winding roll 135, which functions as a sub-feed roller, includes a reel (not shown) that is rotatably supported. One end of the substrate 1 is connected to the reel. The winding roll 135 includes a winding motor (not shown) that rotationally drives the reel.

The substrate 1 is guided by the transport device 10 and the pass rollers 122 of the winding unit 120 to be transported to a position facing the inspection unit 124.

The inspection unit 124 examines an image printed on the printing surface of the substrate 1. The inspection unit 124 includes a scanner 126 and a scanner 128. The configurations of the scanner 126 and the scanner 128 are the same as those of the scanner 71 and the scanner 72.

Each of the scanner 126 and the scanner 128 is disposed close to a surface opposite to the printing surface of the substrate 1 and reads an image printed on the printing surface of the substrate 1 from the surface opposite to the printing surface. Whether or not the image read by the scanner 126 and the scanner 128 is favorable is determined by a determination unit (not shown).

The substrate 1 of which an image has been examined by the inspection unit 124 is guided by the pass rollers 122 to be transported to the drive roller 130. The drive roller 130, which functions as a sub-feed roller, is rotated by a motor (not shown) and comes into contact with the substrate 1 to transport the substrate 1. The substrate 1 transported by the drive roller 130 is transported to the drive roller 132. The drive roller 132 is rotated by a motor (not shown) and comes into contact with the substrate 1 to transport the substrate 1.

The substrate 1 transported by the drive roller 132 is guided by the plurality of pass rollers 122 to be transported to a tension pickup roller 134. The substrate 1 of which the transport tension has been detected by the tension pickup roller 134 is guided by the pass rollers 122 and is wound onto the winding roll 135.

The retaining roller 136 is disposed at a position facing the winding roll 135. The retaining roller 136 is provided at a distal end of a swing arm 138. The swing arm 138 presses the retaining roller 136 against the substrate 1 wound on the winding roll 135 with pressing means (not shown).

In the ink jet printing apparatus 200 configured as described above, the substrate 1 is transported in the order of the unwinding unit 40, the pre-coating unit 50, the jetting unit 60, the drying device 100, and the winding unit 120, and processing is performed on the substrate 1 in each of the unwinding unit 40, the pre-coating unit 50, the jetting unit 60, the drying device 100, and the winding unit 120 so that a printed matter is produced.

Regarding the ink jet printing apparatus 200, it can be said that the drying device 100 is disposed in the first atmosphere, the winding unit 120 is disposed in the second atmosphere, and the pass rollers 12A, 12B, 12C, and 12D of the transport device 10 are disposed in the second atmosphere. The transport device 10 can transport the substrate 1 without causing wrinkles in an environment with a temperature gradient difference from the first atmosphere of which the temperature is relatively high to the second atmosphere of which the temperature is relatively low and is a normal temperature.

In addition, regarding the ink jet printing apparatus 200, it can be said that the jetting unit 60 is disposed in the first atmosphere, the drying device 100 is disposed in the second atmosphere, and the pass rollers 22A, 22B, and 22C of the transport device 20 are disposed in the first atmosphere. The transport device 20 can transport the substrate 1 without causing wrinkles in an environment with a temperature gradient difference from the first atmosphere of which the temperature is relatively low and is a normal temperature to the second atmosphere of which the temperature is relatively high.

Others

The technical scope of the present invention is not limited to the scope described in the above-described embodiments. The configurations and the like in the respective embodiments can be combined as appropriate among the embodiments in a range not deviating from the gist of the present invention.

EXPLANATION OF REFERENCES

1: Substrate
1A: Printing surface
10: Transport device
12A: Pass roller
12B: Pass roller
12C: Pass roller
12D: Pass roller
14A: Hot air heater
14B: Hot air heater
14C: Hot air heater
14D: Hot air heater
16B: Membrane surface thermometer
16C: Membrane surface thermometer
16D: Membrane surface thermometer
18: Processor
19: Memory
20: Transport device
22A: Pass roller
22B: Pass roller
22C: Pass roller
24A: Hot air heater
24B: Hot air heater
26B: Membrane surface thermometer
26C: Membrane surface thermometer
30: Transport device
32A: Spot cooler
32B: Spot cooler
40: Unwinding Unit
41: Unwinding roll
42: Pass roller
43: Drive roller
44: Drive roller
45: Corona treatment unit
46: Tension pickup roller
50: Pre-coating unit
52: Pass roller

53: Coater
54: Coating roller
55: Chamber
56: Opposing roller
58: PC drying unit
60: Jetting unit
62: Pass roller
63: Tension pickup roller
64: Contactless turn unit
65: Suction drum
66: Tension pickup roller
67: Suction drum
68: Contactless turn unit
70C: Ink jet head
70K: Ink jet head
70M: Ink jet head
70W1: Ink jet head
70W2: Ink jet head
70Y: Ink jet head
71: Scanner
72: Scanner
100: Drying device
102: Pass roller
102A: Pass roller
102B: Pass roller
102C: Pass roller
102D: Pass roller
104: Hot air heater
106: First-Touch Roller
120: Winding unit
122: Pass roller
124: Inspection unit
126: Scanner
128: Scanner
130: Drive roller
132: Drive roller
134: Tension pickup roller
135: Winding roll
136: Roller
138: Swing arm
200: Ink jet printing apparatus

What is claimed is:

1. A transport device which transports a web-shaped substrate from a first atmosphere of a first atmosphere temperature to a second atmosphere of a second atmosphere temperature different from the first atmosphere temperature along a transport path, the transport device comprising:

a plurality of pass rollers that are disposed in the transport path and that each support the substrate;

a plurality of heaters that heat the plurality of pass rollers respectively;

a memory that stores a command that a processor executes;

the processor that executes the command stored in the memory; and a thermometer that measures a surface temperature of the substrate, wherein the processor controls the heater based on a measurement result of the thermometer to adjust a surface temperature of the pass roller, wherein the plurality of heaters perform heating such that the closer a pass roller is to an upstream side of the transport path, the closer a temperature to which the pass roller is heated is to the first atmosphere temperature and the closer a pass roller is to a downstream side of the transport path, the closer a temperature to which the pass roller is heated is to the second atmosphere temperature, and wherein the processor controls the heater based on a difference between an amount of expansion of the substrate at the surface temperature of the substrate and an amount of expansion of the substrate at the surface temperature of the pass roller to adjust the surface temperature of the pass roller.

2. The transport device according to claim 1, wherein the processor controls the heater and adjusts the surface temperature of the pass roller such that t satisfies $\Delta L(T)-\Delta L(t)\leq 2.3$ mm in a case where the second atmosphere temperature is lower than the first atmosphere temperature, and the processor controls the heater and adjusts the surface temperature of the pass roller such that t satisfies $\Delta L(t)-\Delta L(T)\leq 2.3$ mm in a case where the second atmosphere temperature is higher than the first atmosphere temperature, where T (unit: ° C.) is the surface temperature of the substrate, t (unit: ° C.) is the surface temperature of the pass roller, and $\Delta L(T)$ and $\Delta L(t)$ (unit: mm) are amounts of expansion of the substrate at temperatures of T° C. and t° C., respectively.

3. The transport device according to claim 1, further comprising:

a plurality of thermometers each of which is disposed between the plurality of pass rollers in the transport path, wherein the processor adjusts the surface temperature of each of the plurality of pass rollers based on a measurement result of the thermometer disposed upstream of each pass roller.

4. The transport device according to claim 2, further comprising:

a plurality of thermometers each of which is disposed between the plurality of pass rollers in the transport path, wherein the processor adjusts the surface temperature of each of the plurality of pass rollers based on a measurement result of the thermometer disposed upstream of each pass roller.

5. The transport device according to claim 1, wherein the thermometer performs measurement without coming into contact with the substrate.

6. The transport device according to claim 2, wherein the thermometer performs measurement without coming into contact with the substrate.

7. The transport device according to claim 3, wherein the thermometer performs measurement without coming into contact with the substrate.

8. The transport device according to claim 1, wherein the heater includes a hot air heater that blows hot air toward the pass roller.

9. The transport device according to claim 1, wherein the heater heats the pass roller from an inside of the pass roller.

10. The transport device according to claim 1, further comprising:

a spot cooler that blows cooling air toward the substrate in a case where the second atmosphere temperature is lower than the first atmosphere temperature.

11. A drying device comprising:

the transport device according to claim 1; and a drying heater that is disposed in the first atmosphere or the second atmosphere and that heats the substrate.

12. A printing apparatus comprising:

the transport device according to claim 1;

a liquid applying head that is disposed in the first atmosphere and that applies liquid to a surface of the substrate; and a drying heater that is disposed in the second atmosphere and that heats the substrate, wherein the plurality of pass rollers are disposed between the liquid applying head and the drying heater.

13. A printing apparatus comprising:

the transport device according to claim 1;

a liquid applying head that is disposed upstream of the first atmosphere in the transport path and that applies liquid to a surface of the substrate; and a drying heater that is disposed in the first atmosphere and that heats the substrate, wherein the plurality of pass rollers are disposed in the second atmosphere.

* * * * *